United States Patent
Ordentlich et al.

(10) Patent No.: US 6,263,109 B1
(45) Date of Patent: Jul. 17, 2001

(54) CONTEXT-BASED ORDERING AND CODING OF TRANSFORM COEFFICIENT BIT-PLANES FOR EMBEDDED BITSTREAMS

(75) Inventors: Erik Ordentlich, Palo Alto; Marcelo Weinberger, San Jose; Gadiel Seroussi, Cupertino, all of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/160,648

(22) Filed: Sep. 25, 1998

(51) Int. Cl.[7] .................................... G06K 9/36
(52) U.S. Cl. .................. 382/232; 382/236; 382/240; 382/248
(58) Field of Search ...................... 382/232, 240, 382/253, 236, 248; 348/193, 419.1

(56) References Cited

U.S. PATENT DOCUMENTS

| | | | |
|---|---|---|---|
| 5,412,741 | 5/1995 | Shapiro | 382/232 |
| 5,764,374 | * 6/1998 | Seroussi et al. | 358/427 |
| 5,764,807 | 6/1998 | Pearlman et al. | 382/240 |
| 5,825,929 | * 10/1998 | Chen et al. | 382/236 |
| 5,867,602 | * 2/1999 | Zandi et al. | 382/248 |
| 5,909,513 | * 6/1999 | Liang et al. | 382/253 |
| 5,995,668 | * 11/1999 | Corset et al. | 382/233 |

OTHER PUBLICATIONS

Ordentlich et al., "A Low Complexity Modeling Approach for Embeded Coding of Wavelet Coefficients", Data Compression Conference, 1998. DCC '98. Proceedings, pp. 408–417.*

Seroussi et al., "On Adaptive Strategies for an Extended Family of Golomb type Codes", Data Compression Conference, 1997. DCC'97 . Proceedings, pp. 131–140.*

Jin Li et al., "Sharp Rate–Distortion Optimized Embedded Wavelet Coding ——An Algorithm Proposal for JPEG 2000, "Oct. 10, 1997.

* cited by examiner

Primary Examiner—Jose L. Couso
Assistant Examiner—Anh Hong Do

(57) ABSTRACT

A method of generating an embedded bitstream from quantized Wavelet transform coefficients includes the steps of separating the quantized coefficient bit-planes into a plurality of subsequences, ordering the subsequences according to decreasing expected distortion reduction per expected bit of description, encoding the subsequences, and appending the encoded subsequences to the bitstream as ordered. The subsequences may be ordered according to a priori assumptions about the expected distortion reduction per expected bit of description. The subsequences may be coded by adaptive run length coding such as adaptive elementary Golomb coding.

40 Claims, 7 Drawing Sheets

FIGURE 3

|   | A | B | C | D | E | F | G | H |
|---|---|---|---|---|---|---|---|---|
| 1 | SB0 | SB3 |  | SB6 |  |  |  |  |
| 2 | 100,- | SB2 |  |  |  |  | SB9 |  |
| 3 | 100,+ | 0 |  | SB5 |  |  |  |  |
| 4 | 001,- | 0 |  |  |  |  |  |  |
| 5 | 0 | 0 | 0 | 0 |  |  |  |  |
| 6 | 0 | 0 | 100,+ | 010,+ |  |  | SB8 |  |
| 7 | 0 | 0 | 001,- | 0 |  |  |  |  |
| 8 | 010,- | 0 | 0 | 0 |  |  |  |  |

FIGURE 7
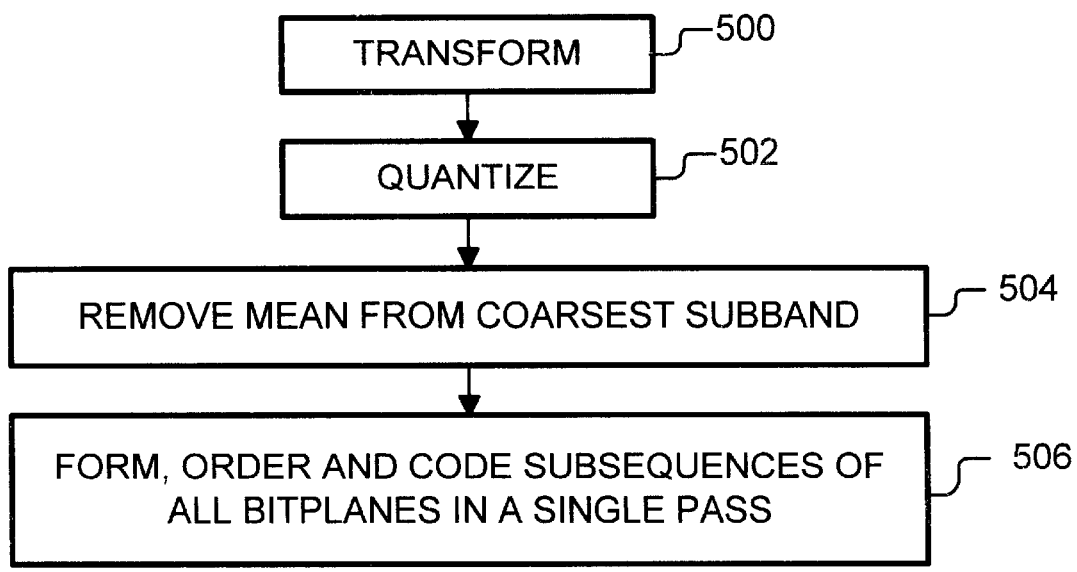
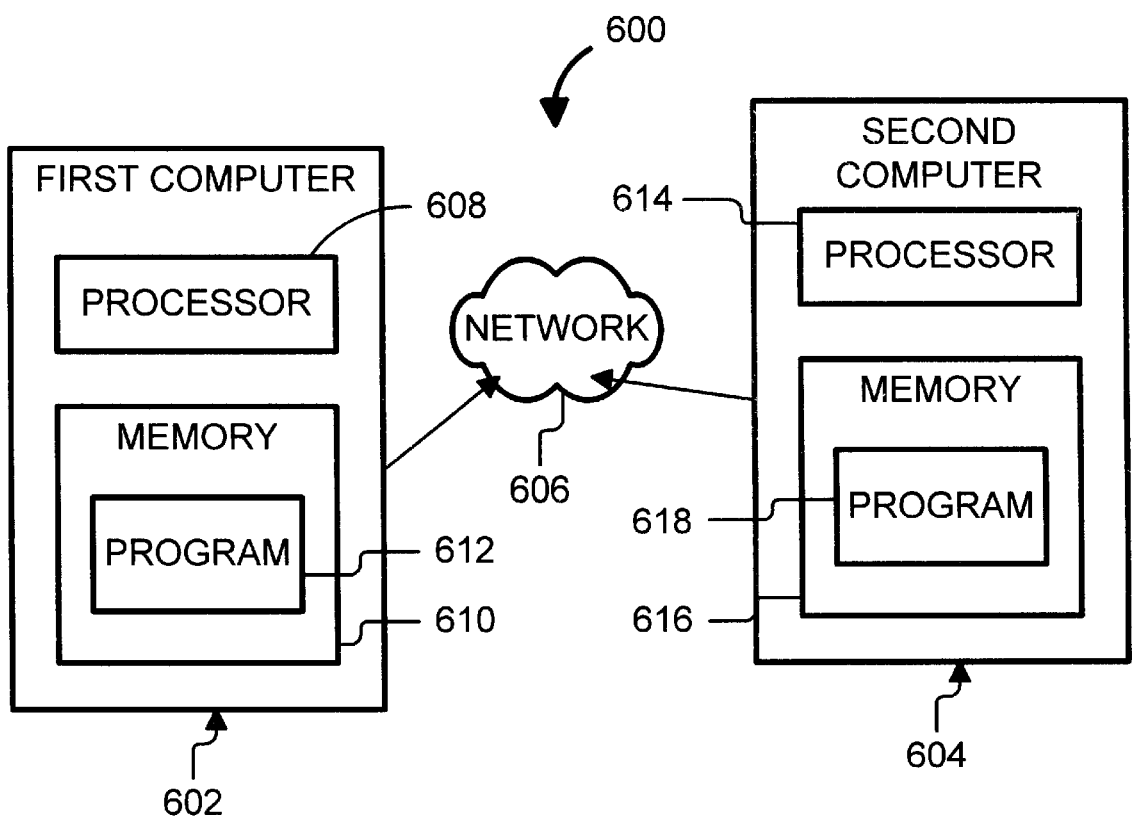
FIGURE 8

CONTEXT-BASED ORDERING AND CODING OF TRANSFORM COEFFICIENT BIT-PLANES FOR EMBEDDED BITSTREAMS

BACKGROUND OF THE INVENTION

The invention relates to data compression. More specifically, the invention relates to the generation of embedded bitstreams.

Data compression is often used for reducing the cost of storing large data files on computers as well as reducing the time for transmitting large data files between computers. In the so-called "transform methods" data is transformed into coefficients that represent the data in a frequency domain. Coefficients may be quantized (lossy compression) without significantly affecting the quality of data that is reconstructed from the quantized coefficients. Redundancy in the coefficients may then be reduced or eliminated (lossless compression) without affecting quality of the reconstructed data.

One well known class of transforms are Wavelet transforms. The Wavelet transforms may be used to perform subband decomposition and produce coefficients that describe the data in a hierarchical multiscale representation. Wavelet transforms have proven useful for the compression of images and the analysis of signals. They have been proposed as the transform for the emerging JPEG-2000 standard.

Among the advantages of the Wavelet transforms, the transform coefficients can be ordered in a hierarchical structure and transmitted in an "embedded bitstream." The embedded bitstream has a property whereby prefixes of the bitstream yield a continuum of lower rate descriptions of the data at the highest possible levels of quality. If the embedded bitstream is truncated during transmission of image data, for instance, the information already transmitted will allow an entire image to be reconstructed. The quality of the reconstructed image is dependent upon the amount information transmitted. If an embedded bitstream is truncated, a complete image of reduced quality can be reconstructed from the transmitted bits. In contrast, truncation of a non-embedded transmission might only allow several rows of an image to be reconstructed.

As additional information is transmitted, the quality of the reconstructed image is improved. If the entire bitstream is transmitted without truncation, a lossless or near-lossless image can be reconstructed.

The transmission just described is often referred to as a progressive-by-quality image transmission. The coefficients are described by bit-planes, and the most significant coefficient bits (that is, the coefficient bits conveying the most important information) are transmitted first.

Another type of transmission is often referred to as a progressive-by-resolution transmission. The progressive-by-resolution transmission involves ordering the coefficients according to different levels of image resolution. The different levels are identified by markers in the embedded bitstream. A computer may use the markers to parse the bitstream and transmit the data for the coefficients corresponding to a resolution that is specified by the receiving computer. The receiving computer can reconstruct an image according to the specified resolution.

A number of coding algorithms have been proposed for ordering the description of transform coefficients such that the retained number of bits of the description can produce the best quality image. Algorithms have been proposed by Shapiro (the "Zerotree" algorithm) and Said-Pearlman (the "SPIHT" algorithm) among others.

There are a number of problems associated with Zerotree and SPIHT algorithms. Both the Zerotree and SPIHT algorithms are based on the construction of a data structure known as a Zerotree. The Zerotree data structure is complex and memory-intensive. The encoding of quantized coefficient bit-planes relies on the use of a complex arrangement of lists and pointers.

Moreover, the Zerotree and SPIHT algorithms minimize image distortion only at bit-plane boundaries. As long as the transmission is truncated at a bit-plane boundary, the image distortion will be minimized. However, if a transmission is truncated at a point other than a bit-plane boundary, the image distortion will not be minimized.

Very often, however, the bit rate of the transmission is not controllable such that the transmission is truncated at a bit-plane boundary. For example, bit rate control might depend upon buffer size in a client. The transmission will be truncated when the buffer is full. Thus, the bit rate will depend upon the size of the buffer in the client.

Truncation of a progressive quality transmission might also occur if a network goes down. Again, the truncation might not occur at a bit-plane boundary. Thus, the image distortion might not be minimized given the amount of information that was transmitted.

Additionally, the Zerotree coders do not provide a clean separation between modeling, ordering, coding and algorithmic components. Consequently, it is difficult to tailor the Zerotree coders to satisfy certain constraints on memory and complexity. Additionally, it is difficult for Zerotree coders to provide a single bitstream that can be parsed efficiently to address both progressive-by-quality and progressive-by-resolution transmissions. Zerotree coders do not directly yield resolution-scalable bitstreams that allow for efficient progressive-by-resolution transmissions. Modifying the coding for the progressive-by-resolution transmission results in a sacrifice in performance of the progressive-by-quality transmission.

There is a need for ordering the description of the transform coefficients in a relatively simple and fast manner and to reduce image distortion over a wider range of bit rates. Overall, there is a need for a coder that is less complex than a Zerotree coder. There is also a need for a coder that has a clean separation between modeling, ordering, coding and algorithmic components.

SUMMARY OF THE INVENTION

These needs are met by the present invention. An embedded bitstream is built from data (e.g., a subband decomposition of an image) separated into a plurality of subsequences (e.g., sub bit-planes). The subsequences are ordered according to decreasing expected distortion reduction per expected bit of description. At least some of the ordered subsequences are encoded, and the encoded subsequences are placed in the bitstream as ordered.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 3 is an illustration of exemplary quantized coefficients for the subband decomposition shown in FIG. 1;

FIG. 7 is a flowchart of generating a bitstream in a single pass; and

FIG. 8 is an illustration of an encoder/decoder system according to the present invention.

DETAILED DESCRIPTION OF THE INVENTION

Figure 1:
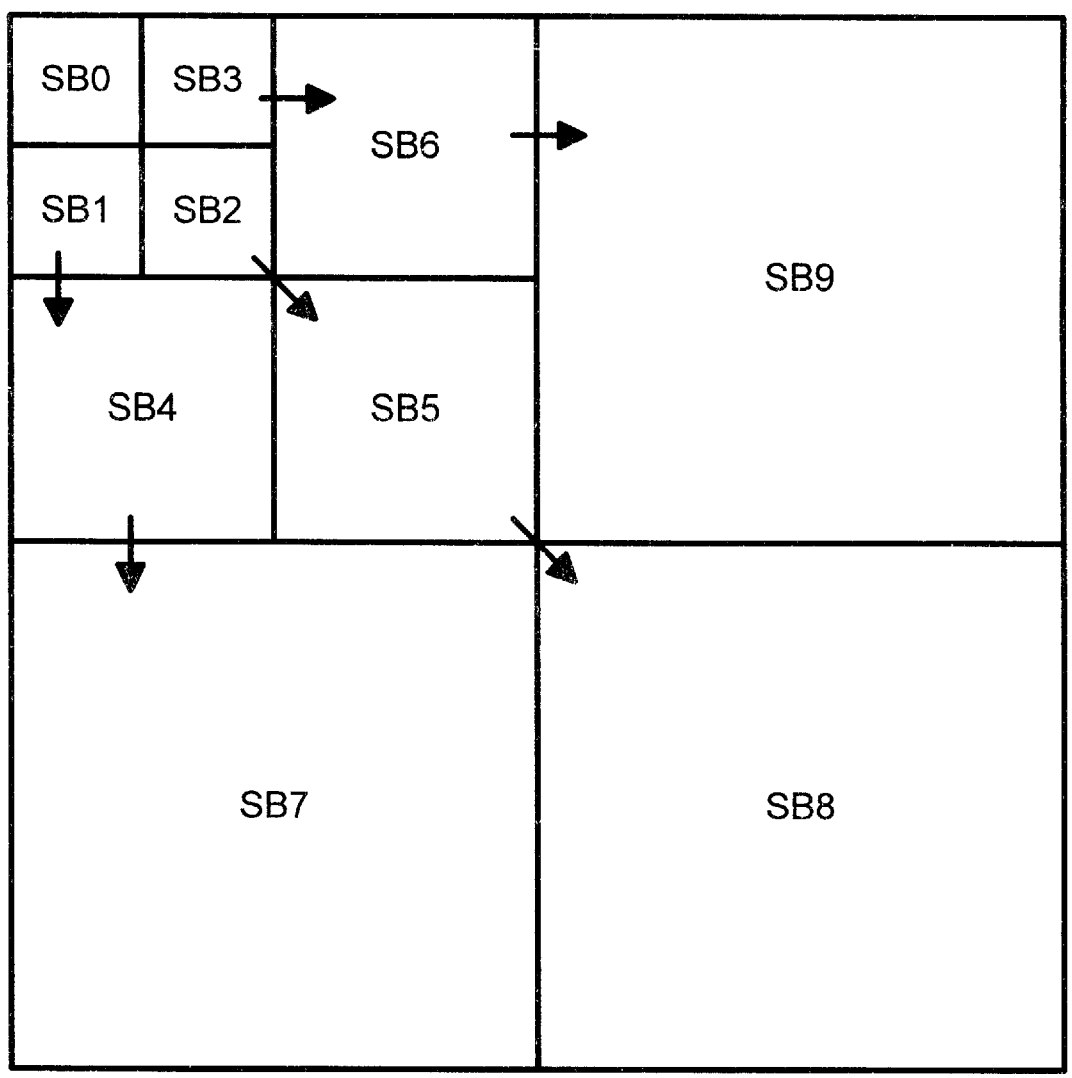
FIG. 1 is an illustration of a subband decomposition of an image.

As shown in the drawings for purposes of illustration, the present invention is embodied in a method of generating an embedded bitstream. The method generates an embedded bitstream including transform coefficient bits that are described in order of decreasing expected distortion reduction per expected bit of description. The ordering is relatively simple and fast to perform. The method also lends itself to the use of low complexity coding such as adaptive elementary Golomb coding. The method also offers a clean separation between modeling, ordering, coding and algorithmic components.

The invention will be described as follows. First, transformation of image data into transform coefficients will be described. Next, a description of quantizing the coefficient bits into bit-planes will be provided. Then various methods of ordering and coding the quantized coefficient bits and generating embedded bitstreams will be described. Following the description of the method will be descriptions of an encoder and decoder according to the present invention.

FIG. 1 illustrates a hierarchical subband decomposition 8 of an eight pixel-by-eight pixel image. A Wavelet transform may be used to perform the subband decomposition. At a first level of decomposition, image data (e.g., luminance or chrominance data of an image) is filtered by high pass and low pass filters, both horizontal and vertically, and then each of the resulting bands is subsampled by a factor of two horizontally and vertically. Resulting at the first level are the following subbands: a high-pass horizontal, high-pass vertical subband; a high-pass horizontal, low-pass vertical subband; a low-pass horizontal, high-pass vertical subband; and a low-pass horizontal, low-pass vertical subband. Each subband is one-quarter the size of the original image.

Each additional decomposition is performed on the coarsest subband. Thus, a second decomposition would be performed on the low-pass horizontal, low-pass vertical subband. Three levels of decomposition are performed to produce the three-level subband decomposition 8 shown in FIG. 1. Reference will hereinafter be made to the subband decomposition 8 merely to simplify the description of the method according to the present invention. In actual practice, the number of levels of decomposition will depend upon image size.

The coarsest frequency information may be found in the lowest frequency subband, which is located in the upper left corner (subband SB0) of the subband decomposition 8. The finest frequency information may be found in the highest frequency subband, which is located in lower right corner (subband SB9) of the subband decomposition 8.

Parent-child dependencies are shown with the arrows pointing from the subband of the parent nodes to the subbands of the child nodes. Each subband SB0 to SB9 of the subband decomposition 8 includes an array of transform coefficients $c_i$, where i is the coefficient index according to a scan of coefficients in the subband decomposition 8. There is also the usual parent-child relationship among Wavelet transform coefficients.

The coefficients are then quantized and described by bit-planes. A bit-plane may be generated by quantizing the coefficients as follows:

$$q_i = \left\lfloor \frac{|c_i|}{\Delta} \right\rfloor \text{sgn}(c_i)$$

where $q_i$ is the quantization value, sgn is the sign of the coefficient $c_i$, and $\Delta$ is the quantization step. The quantizer according to the equation above is a "deadzone" quantizer.

A quantized coefficient $q_i$ may be represented across m+1 bit-planes as follows:

$$b_{m,i} b_{m-1,i} b_{m-2,i} \ldots b_{2,i} b_{1,i} b_{0,i} \text{sgn}_i$$

where $[b_{m,i}, \ldots, b_{0,i}]$ is the binary representation of $|q_i|$ and $\text{sgn}_i$ is the sign of the quantized coefficient $q_i$. The integer m is the smallest integer that satisfies $2^{m+1} > |q_i|$ for all i. Thus, if the greatest value of $q_i$ is 255, then m=7. The $n^{th}$ bit-plane consists of the bits $b_{n,i}$. Thus, the $m^{th}$ bit-plane ($b_m$) includes the most significant bit of all quantized coefficients $q_i$, and the last bit-plane 0 includes the least significant bit of all quantized coefficients $q_i$.

A coefficient $q_i$ is said to be "significant" with respect to the $n^{th}$ bit-plane if one of its bits $b_{m,i}, \ldots b_{n+1,i}, b_{n,i}$ is non-zero. Significance information in bit-plane n refers to those $b_{n,i}$ for which bits $b_{m,i} \ldots b_{n+1,i}$ are all zero (that is, information in a bit-plane n for a quantized coefficient $q_i$ that has not yet been found to be significant). Refinement information in a bit-plane refers to those $b_{n,i}$ for which one of those bits $b_{m,i} \ldots b_{n+1,i}$ are non-zero (that is, the information in plane n for a coefficient that has already been found to be significant).

Figure 2:
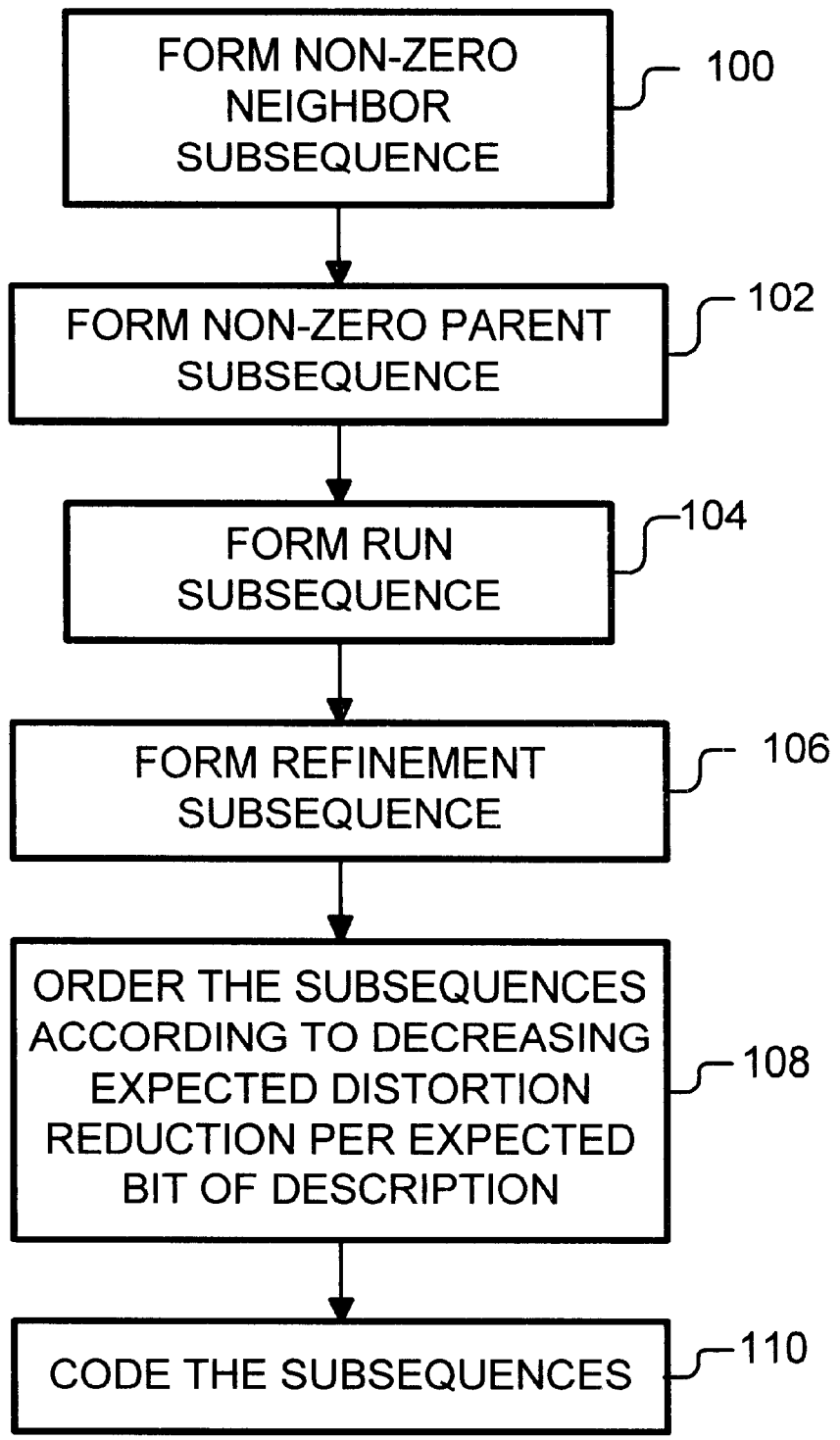
FIG. 2 is a flowchart of a method of coding quantized transform coefficients in accordance with the present invention.

Reference is now made to FIG. 2, which shows a method of coding the quantized coefficients $q_i$. A bit-plane is decomposed into a plurality of sub-bit-planes or subsequences (blocks 100, 102, 104 and 106), and the subsequences are adaptively ordered according to decreasing expected distortion reduction per expected bit of description (block 108). It will be implicitly assumed that the sign $\text{sgn}_i$ of a coefficient $q_i$ is encoded into the bitstream immediately after the first non-zero bit of the coefficient $q_i$ is encoded as the bit-planes are processed from most significant to least significant.

The application of the ordering criteria above can be simplified by relying upon some reasonable assumptions about the distribution of Wavelet coefficients. These assumptions imply that in each bit-plane significance information should precede refinement information. These assumptions also imply that in each bit-plane, for significance information consisting of bits $b_{n,i}$ the expected distortion reduction per expected bit of description is non-decreasing in the probability that $b_{n,i}=1$ (the probability that the $i^{th}$ coefficient becomes significant in the $n^{th}$ bit-plane). Thus, the ordering of subsequences of significance information may be done according to an estimate of the relative magnitudes of the probabilities that $b_{n,i}=1$ in each of the subsequences. Note that for the ordering of significance information, the actual values of the probabilities need not be ascertained. Instead, a ranking according to decreasing magnitude may suffice.

The ranking of the probabilities that $b_{n,i}=1$ (according to decreasing magnitude) in the subsequences could be adaptively learned or estimated for each image. In the alternative, the ranking could be based on a priori assumptions. The decision on how to order the refinement information relative to the subsequences of significance information may depend on comparing the estimates of the probability of 1 in each subsequence to a threshold. Refinement information should precede all subsequences with significance probabilities that are smaller than the threshold. In practice, it is assumed that these probabilities are always larger than the threshold. Consequently, refinement information is ordered after significance information.

The following additional assumptions may be made about the relative magnitudes of the probabilities that $b_{n,i}=1$ in each of the subsequences of significance information. It is reasonable to assume that a coefficient having significant neighbors will have a higher probability of becoming significant than a coefficient having all insignificant neighbors. It is also reasonable to assume that a coefficient having a significant parent will have a higher probability of becoming significant than a coefficient having an insignificant parent. The above assumptions imply that a bit of a coefficient having significant neighbors with respect to previous bit-planes will have a greater expected distortion reduction per expected bit of description than a bit of a coefficient having all insignificant neighbors with respect to the previous bit-planes; and a bit of a coefficient having a significant parent with respect to the previous bit-planes will have a greater expected distortion reduction per expected bit of description than a bit of a coefficient having an insignificant parent with respect to the previous bit-plane.

By way of example, the following four subsequences could be formed and ordered according to the above assumptions about expected distortion reduction per expected bit of description: a Non-Zero Neighbor subsequence, a Non-Zero parent subsequence, a Run subsequence, and a Refinement subsequence.

Each coefficient bit $b_{n,i}$ in the Non-Zero Neighbor subsequence corresponds to a coefficient that is not significant with respect to the $(n+1)^{th}$ bit-plane. Thus, $b_{m,i}$, =0, $b_{m-1,i}=0, \ldots, b_{n+1,i}=0$. The bit $b_{n,i}$ is part of the significance information for the $n^{th}$ bit-plane. However, at least one coefficient in the neighborhood of coefficient bit $b_{n,i}$ was found to be significant with respect to the $(n+1)^{th}$ bit-plane. Thus, $[b_{m,j}, b_{m-1,j}, \ldots, b_{n+1,j}] \neq 0$ for some j in the neighborhood (where the vector notation $[\ldots] \neq 0$ means that one of the bits within the brackets is not equal to zero). A neighborhood might include eight spatially adjacent neighboring coefficients. Thus, each coefficient bit $b_{n,i}$ in the Non-Zero Neighbor subsequence was still insignificant with respect to the previous bit-plane, but it had at least one significant neighbor with respect to the previous bit-plane.

Each coefficient bit $b_{n,i}$ in the Non-zero Parent subsequence corresponds to a coefficient that is not significant with respect to the $(n+1)^{th}$ bit-plane. Additionally, no coefficient in the neighborhood of coefficient bit $b_{n,i}$ was found to be significant with respect to the $(n+1)^{th}$ bit-plane. However, the parent of the coefficient $q_i$ was found to be significant with respect to the $(n+1)^{th}$ bit-plane. Thus, $[b_{m,f(i)}, \ldots, b_{n+1,f(i)}] \neq 0$ where the index f(i) corresponds to the parent of coefficient $q_i$. Thus, each coefficient bit $b_{n,i}$ in the Non-zero Parent subsequence was still insignificant in the previous bit-plane, and its neighbors in the previous bit-plane are insignificant. However, the parent in the previous bit-plane is significant.

Each coefficient bit $bn_i$ in the Run subsequence corresponds to a coefficient that is not significant with respect to the $(n+1)^{th}$ bit-plane. Additionally, no coefficient in the neighborhood of coefficient bit $b_{n,i}$ was found to be significant with respect to the $(n+1)^{th}$ bit-plane, and also the parent was found to be insignificant with respect to the $(n+1)^{th}$ bit-plane.

Each coefficient bit $b_{n,i}$ in the Refinement sequence corresponds to a coefficient that has already been found to be significant with respect to the $(n+1)^{th}$ bit-plane.

If the additional prior assumptions on the ranking of the probabilities of a 1 are used, the Non-Zero Neighbor subsequence is assumed to have a greater expected distortion reduction per expected bit of description than the Non-Zero Parent subsequence, the Non-Zero Parent subsequence is assumed to have a greater expected distortion reduction per expected bit of description than the Run subsequence, and the Run subsequence is assumed to have a greater expected distortion reduction per expected bit of description than the Refinement subsequence. Thus, the Non-Zero Neighbor subsequence is ordered in the bitstream in front of the Non-Zero Parent subsequence, the Non-Zero Parent subsequence is ordered in front of the bitstream before the Run subsequence, and the Refinement subsequence is ordered in the bitstream after the Run subsequence.

Some (or all) of the ordered sub-bit-planes are encoded (block 110), and the encoded sub-bit-planes are placed in the bitstream as ordered (block 112).

The subsequences may be entropy encoded to extract statistical redundancy in the bitstream by estimating the probability of sequences of symbols occurring. Shorter code lengths are assigned to the more probable sequences of symbols such that the average encoding length is minimized. Thus, the most probable outcome is encoded with the least number of bits. The entropy encoding may be performed by an entropy encoder such as a conventional arithmetic encoder or by a context-based arithmetic encoder.

However, the method lends itself to the use of lower complexity coding schemes in the following manner.

The above subsequences of bits in a bit-plane n represent a de-interleaving of data based on the probability that $b_{n,i}=1$. While the data is de-interleaved to enable ordering of the description of the data in the bit-plane n according to the probability that $b_{n,i}=1$, the de-interleaving also serves as an initial context modeling step that captures most of the dependencies in the data. The de-interleaved subsequences may thus be effectively modeled as separate independently and identically distributed ("i.i.d"). sources (with different statistics for $b_{n,i}=1$) and encoded using adaptive elementary Golomb coding, which is nearly optimal for such sources, as described in a paper entitled "A Low Complexity Modeling Approach for Embedded Coding of Wavelet Coefficients" by E. Ordentlich, M. Weinberger and G. Seroussi, Proceedings of 1998 IEEE Data Compression Conference, Mar. 29 to Apr. 1, 1998, pp. 408–417.

Another example of an adaptation for elementary Golomb coding is disclosed in U.S. Pat. No. 4,191,974.

Adaptive elementary Golomb coding can be very effective for skewed distributions such as the Run subsequence (very high probability of 0). However, it can also be effective for sequences with less skewed distributions such as the the Non-Zero Neighbor and Non-Zero Parent subsequences. The Golomb encoder is less complex than an arithmetic encoder.

The sign of a coefficient is encoded in the bit-stream immediately after the first non-zero bit for that coefficient is encountered, i.e. when the coefficient first becomes significant. When using adaptive elementary Golomb coding to code the subsequences, the sign of a newly significant coefficient $q_i$ is inserted uncoded (after mapping a negative sign to 0 and a positive sign to 1) immediately after the elementary Golomb codeword indicating the first non-zero bit of this coefficient.

In the Refinement subsequence, there is close to an equal probability that the next bit will be a one or a zero. If adaptive elementary Golomb encoding is performed, it is preferred not to code the Refinement subsequence. The uncoded Refinement subsequence should be appended to the bitstream.

Figure 4:
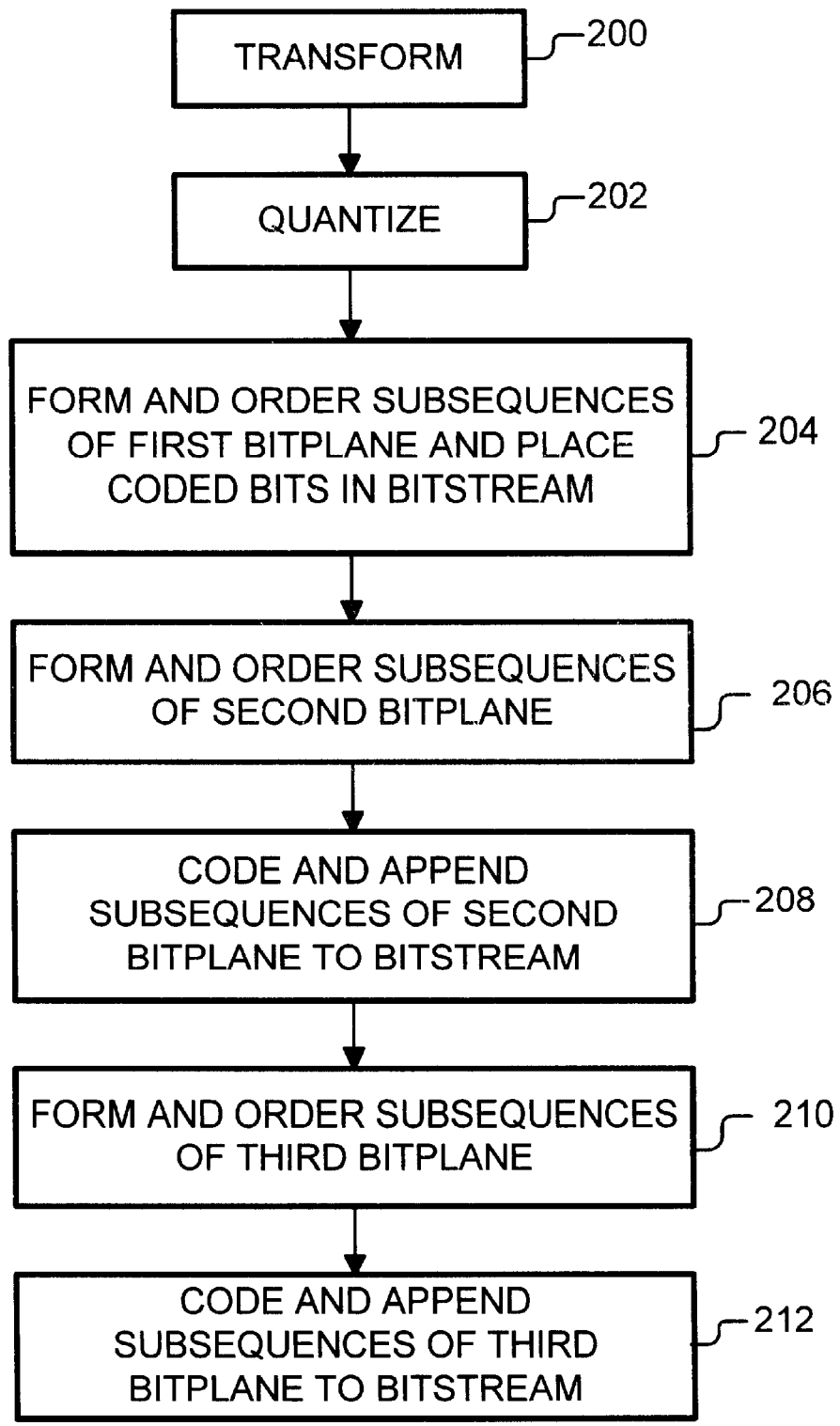
FIG. 4 is a flowchart of a method of generating a bitstream in accordance with the present invention.

A simple example of generating an embedded bitstream is described in connection with FIGS. 3 and 4. Data is transformed via a Wavelet transform (block 200) and quantized (block 202) to produce the coefficients shown FIG. 3. Only quantized coefficients for the lower left zone are shown. This will be sufficient to illustrate how the method is carried out. However, it is understood that coefficients will be processed for the other zones as well.

Again to simplify the explanation of the invention, $|q_i|<8$. Therefore, the coefficients may be described in three bit planes, and each quantized coefficient may be represented as: $b_2$ $b_1$, $b_0$, sgn.

Quantized coefficients will be referred to by row and column numbers instead of the notation $q_i$ described above. Therefore, coefficient A4 will refer to the quantized coefficient in the first column, fourth row. Coefficient A4 is represented as $b_2=0$, $b_1=0$, $b_0=1$ and sgn=(−). Coefficient A4 has four children: coefficients A7, A8, B7 and B8.

After the coefficients have been quantized, a first bit-plane $b_{2,i}$ is coded and placed in the bitstream (block 204). The first bit plane is scanned (e.g., using a raster scan). Each bit that is scanned may be placed in a buffer. When a non-zero bit is found, the sign (sgn) is also placed in the buffer. After the first bit-plane has been scanned, the buffer includes the most significant bit of each quantized coefficient. The buffer is coded and placed in the bitstream.

The second bit-plane $b_{1,i}$ is coded (block 206) according to the method described in connection with FIG. 2. The coarser subbands may be coded before the finer subbands. Within each subband, the coefficient bits are scanned using a raster or some other scan. Each coefficient bit is placed in either the Non-Zero Neighbor subsequence, the Non-Zero Parent subsequence, the Run Subsequence or the Refinement subsequence.

Figure 5:
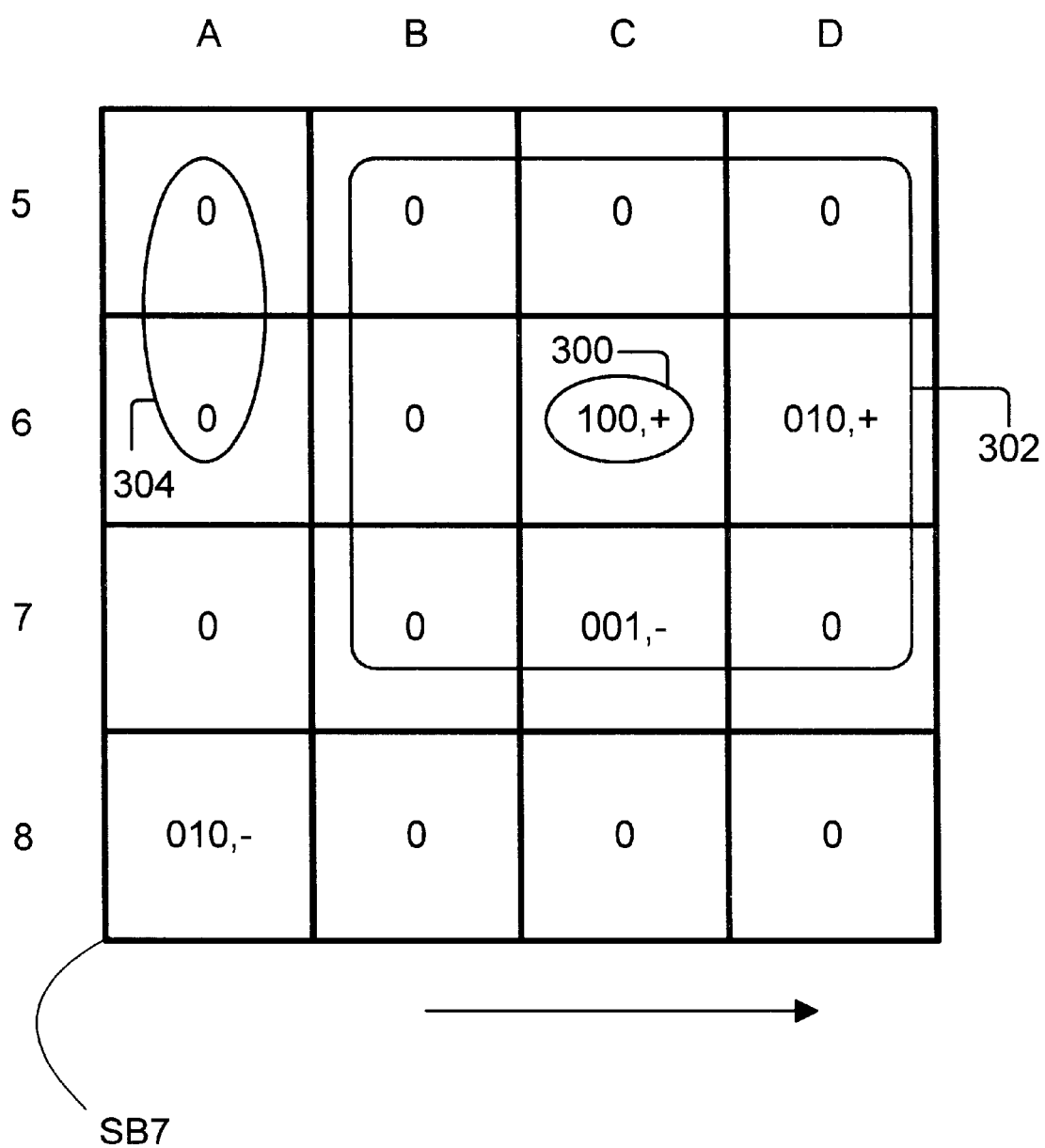
FIG. 5 is an illustration of subsequences of transform coefficients in a subband, the subsequences being formed in accordance with the method shown in FIG. 4.

Additional reference is now made to FIG. 5, which illustrates subsequences in subband SB7. Significance information and refinement information for the second bit-plane is as follows: the second bit $b_1$ of coefficient C6 provides refinement information (since coefficient C6 has already been found to be significant with respect to previous bit-planes); and the second bits $b_1$ of the other coefficients provide significance information.

The subband SB7 is raster scanned one row at a time, starting at row 5. Each row is scanned in the direction of the arrow, starting from column A. Since coefficient C6 (indicated by a first ellipse 300) has already been found to be significant with respect to previous bit-planes, its second bit $b_1$ is added to the Refinement subsequence. The second bits $b_1$ of those coefficients in the neighborhood of coefficient C6 (the neighborhood being indicated by a second ellipse 302) are added to the Non-Zero Neighbor subsequence. Coefficients A5 and A6 (indicated by a third ellipse 304) have insignificant neighbors but a significant parent (coefficient A3); therefore the second bits $b_1$ of coefficients A5 and A6 are added to the Non-Zero Parent subsequence. The remaining coefficients have insignificant neighbors and insignificant parents with respect to previous bit-planes. Therefore, the second bits $b_1$ of the remaining coefficients are added to the Run subsequence. Table 1 shows the resulting subsequences for the second bit-plane. Coefficients corresponding to the second bits $b_1$ are shown in parenthesis. The signs of the newly significant coefficients are also shown.

After the second bit-plane has been scanned, the Non-Zero Neighbor subsequence for the second bit-plane is coded and appended to the bitstream, the Non-Zero Parent subsequence for the second bit-plane is coded and appended to the bitstream, the Run subsequence for the second bit-plane is coded and appended to the bitstream, and the Refinement subsequence for the second bit-plane is appended to the bitstream (block 208). In the alternative, the coefficient bits may be coded and added to the bitstream immediately after they are scanned, thereby eliminating the need for an intermediate buffer.

TABLE 1

| Non-Zero Neighbors | Non-Zero Parent | Run | Refinement |
|---|---|---|---|
| 0 (B5) | 0 (A5) | 0 (A7) | 0 (C6) |
| 0 (C5) | 0 (A6) | 1 (A8), − | |
| 0 (D5) | | 0 (B8) | |
| 0 (B6) | | 0 (C8) | |
| 1 (D6), + | | 0 (D8) | |
| 0 (B7) | | | |
| 0 (C7) | | | |
| 0 (D7) | | | |

After the second bit-plane $b_{1,i}$ has been coded, the third bit-plane $b_{0,i}$ is coded (block 210) according to the method described in connection with FIG. 2. After the third bit-plane has been scanned, the Non-Zero Neighbor subsequence for the third bit-plane is coded and appended to the bitstream, the Non-Zero Parent subsequence for the third bit-plane is coded and appended to the bitstream, the Run subsequence for the third bit-plane is coded and appended to the bitstream, and the Refinement subsequence for the third bit-plane is appended to the bitstream (block 212). Or, in the alternative, the coefficients may be coded and added to the bitstream immediately after they are scanned.

After the last bit-plane has been coded, the method is finished. If the bitstream is truncated during the transmission of the third bit-plane, distortion of the reconstructed image will be minimized given the amount of coefficient bits that were transmitted.

In the example above, ordering of coefficient bits in a current bit-plane was context-based. The ordering was based on the values of coefficient bits that had already been coded. More specifically, the ordering was based on previously encoded bit-planes of neighboring and parent coefficients.

However, the method is not limited to the context described above. The ordering of the coefficient bits may be based on a different context. For example, the ordering may be based on neighbors, but not parents. If the context does not include parents, then the coefficients may be coded in a direction other than coarsest subband to finest subband. Moreover, if the context does not include parents, a transform that does not perform subband decomposition (e.g., a DCT transform) may be used.

The context is not limited to the four subsequences. For example, the Run subsequence could be further decomposed into two additional subsequences. The context could also include subbands other than the parent subband. Run subsequence bits of coefficients having significant neighbors in other subbands could comprise one of the additional subsequences.

Moreover, the ordering method is not limited to the use of previously encoded bit-planes. Coefficient bits that have already been encoded in the current bit plane may be used as context for ordering and coding the unencoded coefficient bits in the current plane. An example of this will now be described in connection with FIG. 6. A raster scan of subband SB7 is performed in the direction indicated by the arrows. Coefficient A5 is scanned first, and coefficient D8 is scanned last. The second bit $b_1$ of coefficient C6 provides refinement information, and the second bits $b_1$ of the other coefficients provide significance information. Note the change to coefficient D7.

Figure 6:
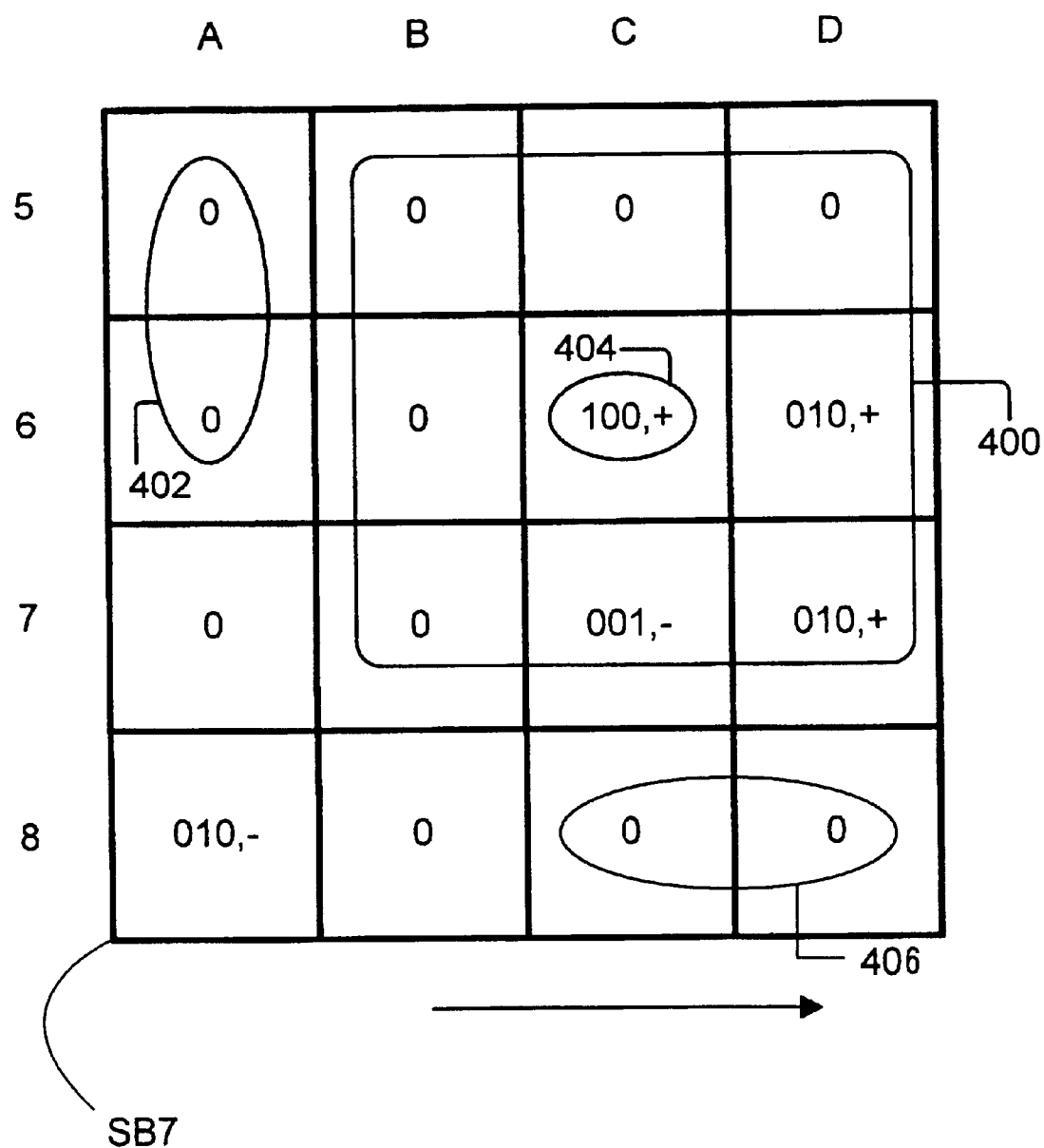
FIG. 6 is an illustration of subsequences of transform coefficients in a subband, the subsequences being formed in accordance with a different method according to the present invention.

As shown in FIG. 6, the second bits $b_1$ for those coefficients B5, C5, D5, B6, D6, B7, C7 and D7 in the neighborhood indicated by a first ellipse 400 are still added to the Non-Zero Neighbor subsequence. The second bits $b_1$ of the coefficients A5 and A6 indicated by a second ellipse 402 are still added to the Non-Zero Parent subsequence. The second bit $b_1$ of the coefficient C6 indicated by the third ellipse 404 is still added to the Refinement subsequence. The second bits $b_1$ of coefficients A7 and A8 are still added to the Run subsequence. However, the second bit $b_1$ of coefficients C8 and D8 (indicated by a fourth ellipse 406) are added to the Non-Zero Neighbor subsequence instead of the Run subsequence. This happens because the coefficient D7 becomes significant during the scan of the second bit-plane and, therefore, is available as context for ordering and coding coefficients C8 and D8 with respect to the second bit-plane.

The method of forming and ordering the subsequences may be implemented in a single pass or multiple passes. The multiple pass could be performed in various ways. All of the subsequences of a given bit-plane could be formed, ordered and coded in a single pass, but the various bit-planes could be coded in multiple passes. Or, the subsequences of each bit-plane could be formed, ordered and coded in multiple passes. The forming, ordering and coding of the subsequences in FIG. 4, for example, is performed in multiple passes.

If the method is performed in a single pass, all of the subsequences for all of the bit-planes will be coded in a single pass. When a coefficient is scanned during single-pass coding, all of its bits are classified into the various subsequences, and all of its subsequences are encoded, all before the next coefficient is scanned. Thus, each coefficient is completely processed before the next coefficient is scanned. FIG. 7 shows steps 500 to 506 for coding first, second and third bit-planes in a single pass.

Other variations to the method include, but are not limited to, the following. Instead of placing the subsequences in files and coding the files after a bit-plane is scanned (as described above), the bits may be coded and placed directly into one or more bitstreams. If separate bitstreams are generated for each of the subsequences, the separate bitstreams may be re-arranged offline (on byte boundaries) for optimal embedding.

Following quantization and before the subsequences for the bit-planes are formed and ordered, the coarsest subband SB0 of the decomposition 8 may be modified by determining the mean of the coefficients in the coarsest subband SB0 and subtracting the mean from the coefficients in the coarsest subband SB0 (see step 504 in FIG. 7). If the coarsest subband SB0 includes only a single coefficient (e.g., coefficient A1), the coefficient of the coarsest subband in the mean-removed decomposition would be equal to 0. The mean of the coarsest subband SB0 may be placed in the header of the bitstream.

The neighborhood is not limited to spatially adjacent neighbors. The neighborhood may be block based. Consider the coefficients C5, D5, C6 and D6 in subband SB7 of FIG. 3. In a 2×2 block-based neighborhood, the neighbors of coefficient C5 might be D5, C6 and D6, and the neighbors of coefficient D6 would be C5, D5 and C6 (in contrast, the spatially adjacent neighbors of coefficient C5 in subband SB7 would be B5, D5, B6, C6 and D6, and the spatially adjacent neighbors of coefficient B5 would be coefficients A5, C5, A6, B6 and C6 ).

The embedded bitstream may be decoded by reversing the method used to generate the bitstream. Thus, reversing the method may be used to reconstruct an image or data signal from the embedded bitstream.

Reference is now made to FIG. 8, which shows an encoder-decoder system 600 according to the present invention. The system 600 includes first and second computers 602 and 604 that communicate over a network 606. The network 606 could be anything from a local area network to the Internet. The first computer 602, which will also be referred to as the encoder 602, includes a first processor 608 and first memory 610 for storing an encoder program 612 that performs data compression. The encoder program 612 might be an image editor program that edits bitmaps and compresses the bitmap images.

The encoder program 612 includes a plurality of executable instructions for instructing the first processor 608 to transform the bitmap image into transform coefficients; quantize the coefficients, generate bit-planes of the quantized coefficients; decompose the bit-planes into the subsequences; order the subsequences according to decreasing expected distortion reduction per expected bit of description; encode the ordered subsequences, place the subsequences in a bitstream as ordered; and send the bitstream to the second computer 204.

The second computer 604, which will also be referred to as the decoder 604, includes a second processor 614 and memory 616 for storing a decoder program 618 that instructs the second processor 614 to decode the bitstream and display a reconstructed image. The second program 618 could be, for example, a web browser or an image editor.

The decoder program 618 instructs the second processor 614 to reverse the steps that were used to generate the bitstream. Thus, the decoder program 618 instructs the second processor 614 to decode the bitstream, determine the bits in subsequences in the decoded bitstream, reconstruct the bit-planes from the determined subsequences, reconstruct the transform coefficients from the bit-planes (the reconstructed values may be in the middle of the available uncertainty interval), and perform an inverse transform on the reconstructed coefficients.

Thus disclosed is an invention that improves upon the ordering of bits in an embedded bitstream. The ordering is relatively simple and fast to perform. The ordering is not based upon complex data structures such as Zerotrees. Moreover, the invention offers a principled basis for performing the ordering.

The invention generates subsequences that can be reasonably modeled as i.i.d., which allows the use of lower complexity coding schemes. Thus, the invention lends itself to the use of low complexity coding such as adaptive elementary Golomb encoding. Although arithmetic encoding of the subsequences could be performed, the adaptive elementary Golomb coding is much simpler to perform.

The invention provides a cleaner separation between modeling, ordering, coding and algorithmic components. This allows the invention to be tuned for particular applications (software versus hardware) and performance versus complexity tradeoffs.

As already discussed, the invention is not limited to the specific embodiments described and illustrated above. Instead, the invention is construed according to the claims that follow.

What is claimed is:

1. A method of generating an embedded bitstream from input data, the method comprising
   separating the input data into a plurality of subsequences;
   ordering the subsequences according to decreasing expected distortion reduction per expected bit of description;
   encoding at least some of the ordered subsequences; and
   placing the encoded subsequences in the bitstream as ordered.

2. The method of claim 1, wherein the ordering is performed according to an estimate of the relative magnitudes of the probabilities that bits in each of the subsequences are equal to one.

3. The method of claim 2, wherein the ordering is performed according to a priori assumptions about the relative magnitudes of the probabilities.

4. The method of claim 2, wherein the relative magnitudes of the probabilities are determined adaptively for the input data, and wherein the ordering is performed according to the adaptively determined probabilities.

5. The method of claim 1, wherein the input data includes bit-planes of transform coefficient bits, and wherein the subsequences include sub-bit-planes of transform coefficient bits.

6. The method of claim 5, wherein a subsequence determination is based upon a context of coefficient bits in previously processed bit-planes.

7. The method of claim 5, wherein a subsequence determination is based upon the context of coefficient bits in a current bit-plane.

8. The method of claim 5, wherein previously encoded bits in a previously processed bit-plane are used to determine which bits are encoded in a current bit-plane, wherein the current bit-plane is decomposed into the subsequences according to the previously encoded bits, and wherein the subsequences are encoded based on the previously encoded bits in order of decreasing distortion reduction per expected bit of description.

9. The method of claim 5, wherein a bit having non-zero neighbors is assumed to have a greater expected distortion reduction per expected bit of description than a bit having all insignificant neighbors.

10. The method of claim 5, wherein a bit having a non-zero parent is assumed to have a greater expected distortion reduction per expected bit of description than a bit having an insignificant parent.

11. The method of claim 1, wherein the subsequences include a Run subsequence, a Non-Zero parent subsequence, and a Non-Zero Neighbor subsequence.

12. The method of claim 11, wherein the Non-Zero Neighbor subsequence is ordered in the bitstream before the Non-Zero Parent subsequence, and wherein the Non-Zero Parent subsequence is ordered in the bitstream before the Run subsequence.

13. The method of claim 12, wherein the subsequences further include a Refinement subsequence, and wherein the Refinement subsequence is ordered in the bitstream after the Run subsequence.

14. The method of claim 11, wherein the subsequences further include a Refinement subsequence.

15. The method of claim 1, wherein the subsequences are entropy encoded.

16. The method of claim 1, wherein the subsequences are adaptive run length coded.

17. The method of claim 16, wherein the subsequences are encoded by adaptive elementary Golomb coding.

18. The method of claim 1, wherein the subsequences for all bit-planes are formed in a single pass.

19. The method of claim 1, wherein the subsequences are formed over multiple passes.

20. The method of claim 1, wherein the subsequences are ordered according to decreasing probability of bits being equal to one.

21. The method of claim 1, further comprising the step of transforming image data into a plurality of Wavelet transform coefficients, and wherein the transform coefficients are quantized, the quantized coefficients being decomposed into the plurality of subsequences.

22. An encoder comprising:
   a processor; and
   processor memory encoded with a plurality of executable instructions that, when executed, instruct the processor to separate the input data into a plurality of subsequences, order the subsequences according to decreasing expected distortion reduction per expected bit of description, and encode at least some of the ordered subsequences;
   the encoded subsequences being placed in the bitstream as ordered.

23. The encoder of claim 22, wherein the ordering is performed according to an estimate of the relative magnitudes of the probabilities that bits in each of the subsequences are equal to one.

24. The encoder of claim 23, wherein the ordering is performed according to a priori assumptions about the relative magnitudes of the probabilities.

25. The encoder of claim 23, wherein the relative magnitudes of the probabilities are determined adaptively for the input data, and wherein the ordering is performed according to the adaptively determined probabilities.

26. The encoder of claim 22, wherein subsequence determinations are based upon a context of coefficient bits in previously processed bit-planes.

27. The encoder of claim 22, wherein subsequence determinations are based upon a context of coefficient bits in current bit-planes.

28. The encoder of claim 22, wherein the subsequences are adaptive run length coded.

29. The encoder of claim 28, wherein the subsequences are encoded by adaptive elementary Golomb coding.

30. Apparatus for processing input data to produce an embedded bitstream, the apparatus comprising:
   means for separating the input data into a plurality of subsequences;
   means for ordering the subsequences according to decreasing expected distortion reduction per expected bit of description; and
   means for encoding at least some of the ordered subsequences;
   whereby the encoded subsequences are placed in the bitstream as ordered.

31. The apparatus of claim 30, further comprising means for transforming data into a plurality of transform coefficients; and means for quantizing the transform coefficients, the quantizing means providing the input data to the separating means.

32. The apparatus of claim 30, wherein the encoding means includes an adaptive run length encoder.

33. An article of manufacture for a processor, the article comprising:

processor memory; and a plurality of executable instructions encoded in the processor memory, the instructions, when executed, instructing the processor to separate the input data into a plurality of subsequences, order the subsequences according to decreasing expected distortion reduction per expected bit of description, and encode at least some of the ordered subsequences;

the encoded subsequences being placed in the bitstream as ordered.

34. The article of claim 33, wherein the ordering is performed according an estimate of the relative magnitudes of the probabilities that bits in each of the subsequences are equal to one.

35. The article of claim 34, wherein the ordering is performed according to a priori assumptions about the relative magnitudes of the probabilities.

36. The article of claim 34, wherein the relative magnitudes of the probabilities are determined adaptively for the input data, and wherein the ordering is performed according to the adaptively determined probabilities.

37. The article of claim 33, wherein the subsequences are based upon a context of coefficient bits that were encoded in previous bit-planes.

38. The article of claim 33, wherein the subsequences are based upon the context of encoded coefficient bits in current bit-planes.

39. The article of claim 33, wherein the subsequences are adaptive run length coded.

40. The article of claim 39, wherein the subsequences are encoded by adaptive elementary Golomb coding.

* * * * *